United States Patent [19]

Nishimura et al.

[11] Patent Number: 4,697,475
[45] Date of Patent: Oct. 6, 1987

[54] CONTROLLER FOR VEHICLE TRANSMISSION WITH AUXILIARY TRANSMISSION

[75] Inventors: Sadanori Nishimura; Noboru Sekine, both of Saitama, Japan

[73] Assignee: Honda Giken Kogyo Kabushiki Kaisha, Tokyo, Japan

[21] Appl. No.: 655,043

[22] Filed: Sep. 26, 1984

[30] Foreign Application Priority Data

Sep. 26, 1983 [JP] Japan ............................. 58-176507

[51] Int. Cl.[4] ............................................. B60K 41/06
[52] U.S. Cl. ....................................... 74/866; 74/745; 74/877; 192/0.076
[58] Field of Search ................. 74/745, 866, 865, 877; 192/48.92, 48.9, 48.8, 0.076, 0.052

[56] References Cited

U.S. PATENT DOCUMENTS

| | | | |
|---|---|---|---|
| 2,975,656 | 3/1961 | Haverlender | 74/745 |
| 3,991,634 | 11/1976 | Longshore | 74/745 |
| 4,294,341 | 10/1981 | Swart | 74/866 X |
| 4,319,501 | 3/1982 | Sugimoto | 74/866 |
| 4,471,437 | 9/1984 | Yoshino et al. | 74/866 X |
| 4,497,223 | 2/1985 | Marayama et al. | 74/866 |
| 4,501,170 | 2/1985 | Muller et al. | 74/866 |

FOREIGN PATENT DOCUMENTS

| | | | |
|---|---|---|---|
| 124851 | 7/1983 | Japan | 74/745 |
| 65648 | 4/1984 | Japan | 74/745 |
| 2063395 | 6/1981 | United Kingdom | 74/745 |

Primary Examiner—Leslie Braun
Assistant Examiner—Dwight G. Diehl
Attorney, Agent, or Firm—Lyon & Lyon

[57] ABSTRACT

A controller for the hydraulic clutch of two speed auxiliary transmission connected in series with the main transmission and engine of a vehicle wherein the hydraulic clutch is applied for the higher speed drive and released for the lower speed drive which is through a one-way clutch that overruns in the higher speed drive operation. The controller is responsive to engine throttle opening to apply the hydraulic clutch for throttle openings below a predetermined amount to allow braking of the vehicle by the engine during deceleration rather than coasting by the overrunning of the one-way clutch.

7 Claims, 7 Drawing Figures

CONTROLLER FOR VEHICLE TRANSMISSION WITH AUXILIARY TRANSMISSION

The present invention relates to a controller for a vehicular transmission with an auxiliary transmission having high and low transmission lines connected in series with the main transmission and engine.

The auxiliary transmission of this type according to the prior art generally has either the high-speed transmission line and the low-speed transmission line selectively established by a synchromesh or another change-over clutch or a hydraulic clutch is disposed in each transmission line so that the selected transmission line may be established when each hydraulic clutch is applied. For the first-mentioned prior art type unit, a shift clutch interposed between the engine and the main transmission has to be released each time there is a speed change operation of the auxiliary transmission which results in undesirable operating characteristics. For the second-mentioned prior art type unit, two hydraulic clutches are required which increases the size and cost of the transmission.

In order to eliminate these difficulties, therefore, the present applicant has previously proposed, in Japanese patent application No. 58-139379, a vehicular transmission in which a hydraulic clutch is disposed in the high-speed transmission line of an auxiliary transmission and a one-way clutch is disposed in the low-speed transmission line of the auxiliary transmission so that the low-speed transmission line may be established by releasing the single hydraulic clutch whereas the high-speed transmission line may be established by the hydraulic clutch being connected. However, with that arrangement, when the accelerator pedal is released to decelerate while the low-speed transmission line is established, overrun of the output side of the transmission is allowed by the one-way clutch whereby braking of the vehicle by the engine is not effective.

In order to eliminate this difficulty, therefore, the present invention has as an object to provide a controller by which the desired braking of the vehicle by the engine is confirmed in terms of the reduction of the throttle opening of the engine to a predetermined level so that the high-speed transmission line may be forcibly established to effect the braking even when the vehicle is running through the low-speed transmission line. Further, the invention is characterized by providing such a controller for the high-speed transmission hydraulic clutch to maintain the clutch in its applied state when the throttle opening of the engine is below a predetermined level.

The present invention will be described in the following in connection with one embodiment thereof with reference to the accompanying drawings, wherein.

Figure 1:
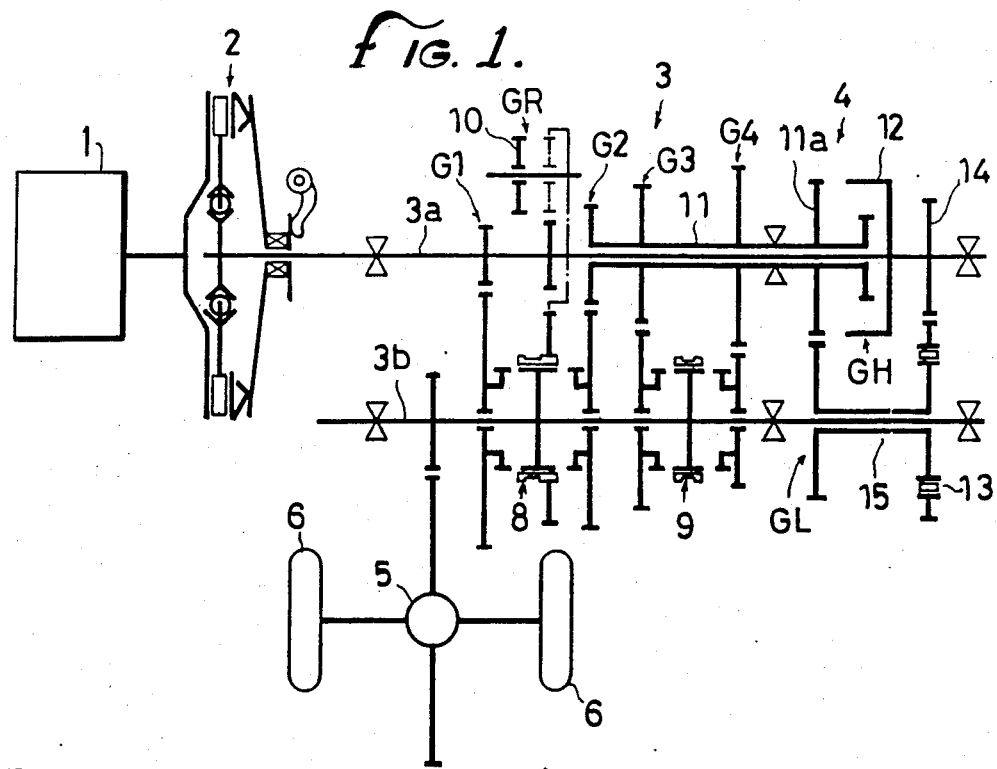
FIG. 1 is a schematic illustration of one example of the vehicular transmission to which the present invention is applied.

Referring to FIG. 1, the engine 1 is connected through a conventional shift clutch 2 to a main transmission 3. An auxiliary transmission 4 is connected in series with the main transmission. Thus, the drive power of the engine 1 is transmitted through the main and auxiliary transmissions 3 and 4 and a differential gear 5 to drive wheels 6 of the vehicle.

Figure 2:
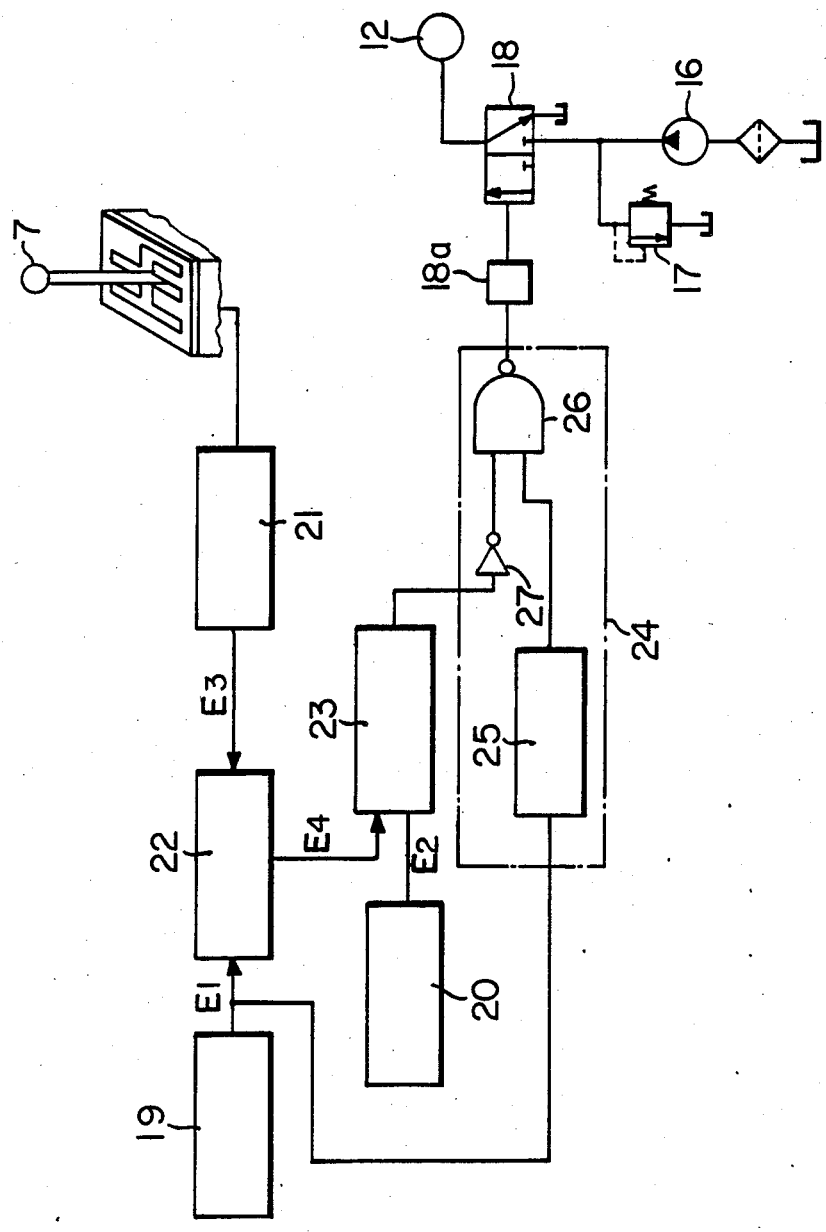
FIG. 2 is a block diagram showing the control circuit for the hydraulic clutch disposed in the highspeed transmission line of the auxiliary transmission of FIG. 1.

The main transmission 3 is provided with forward 1st to 4th speed gear trains G1, G2, G3 and G4 and a reverse gear train GR as its speed change gear mechanism between an input shaft 3a connected to the shift clutch 2 and an output shaft 3b connected to the differential gear 5. The main transmission 3 is of the manual type having four forward gear ratios and one reverse, in which those gear trains G1, G2, G3, G4 and GR are selectively established by the operation of the first and second change-over clutches 8 and 9 for 1-2 and 3-4 speed changes and a reverse idle shift gear 10, which are made coactive with a change lever 7 disposed in a vehicular compartment, as shown in FIG. 2. The auxiliary transmission 4 having high and low transmission lines GH and GL is connected to the input and output sides of the speed change gear mechanism thereby to increase the number of the gear ratios. In the shown construction, a sleeve 11 at the input side of the speed change gear mechanism is borne on the input shaft 3a so that it is connected to the input shaft 3a through the auxiliary transmission 4. A hydraulic clutch 12 is disposed in the high-speed transmission line GH of the auxiliary transmission 4. A one-way clutch 13 for allowing the output side to overrun is disposed in the low-speed transmission line GL of the auxiliary transmission so that the low-speed transmission line GL may be established when the hydraulic clutch 12 is released whereas the high-speed transmission line GH is established when the hydraulic clutch 12 is applied. More specifically, the input shaft 3a has an extension on which the hydraulic clutch 12 for connecting or disconnecting the sleeve 11 and the input shaft 3a is arranged and a coactive gear 11a is fixed on the sleeve shaft 11 and a fixed gear 14 is fixed on the input shaft 3a on either side of the hydraulic clutch 12. On the extension of the output shaft 3b, there is an idle gear mechanism 15 which connects the two gears 11a and 14. The one-way clutch 13 for allowing the overrun of the output side, is disposed in the idle gear mechanism 15. As a result, there is provided a high-speed transmission line GH which leads from the input shaft 3a through the hydraulic clutch 12 to the sleeve 11. There is also provided the low-speed transmission line GL which leads from the input shaft 3a through the fixed gear 14, the idle gear mechanism 15, and the coactive gear 11a to the sleeve 11. When the high-speed transmission line GH is established by the application of the hydraulic clutch 12, the power transmission through the low-speed transmission line GL is interrupted by the action of the one-way clutch 13.

In the illustrated construction, the 1st-speed gear train G1 and the reverse gear train GR are connected directly to the input shaft 3a and the 2nd, 3rd and 4th-speed gear trains G2, G3 and G4 are connected to the sleeve 11 of the auxiliary transmission 4 whereby there are seven forward speeds and one reverse speed. If desired, the lst-speed and reverse gear trains G1 and GR also may be connected to the sleeve 11 to produce eight forward and two reverse speeds.

The hydraulic clutch 12 is applied or released by the control of a change-over valve 18 which is disposed in an oil line for controlling oil from an oil pump 16 and regulator valve 17 and introducing the controlled oil supply into the hydraulic clutch 12, as shown in FIG. 2. Specifically, the change-over valve 18 can be switched between an oil feed position for feeding the oil to the hydraulic clutch 12 and an oil discharge position for discharging the oil from the hydraulic clutch 12 so that the hydraulic clutch 12 is applied when the change-over valve 18 is switched to the oil feed position but is released when the same is switched to the oil discharge position.

The change-over valve 18 may be constructed such that it is coactive with a change lever for the auxiliary transmission disposed in the vehicular compartment. However, the shown embodiment is constructed in the following manner such that the change-over valve 18 is automatically controlled and switched by judging the load upon the engine 1 and the running state of the vehicle in terms of the throttle opening of the engine 1, the vehicle running speed or velocity, and the gear ratio.

Figure 3:
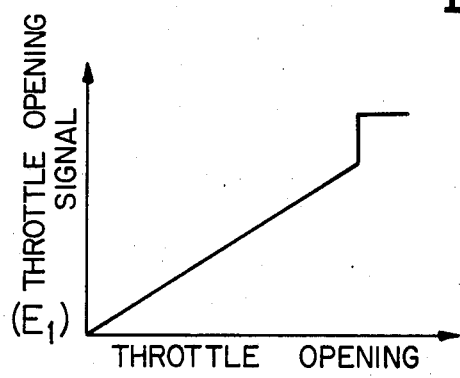
FIGS. 3, 4 and 5 are graphs showing the characteristics of the signals of the throttle opening detector, the vehicle velocity detector and the gear ratio detector of the control circuit.
Figure 4:
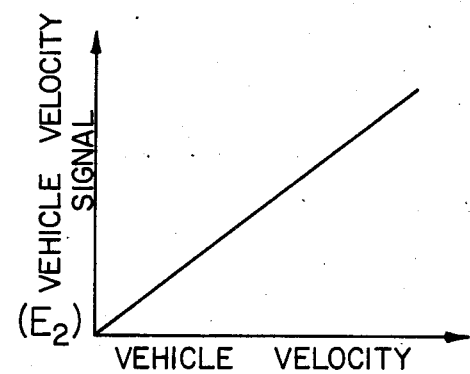
Figure 5:
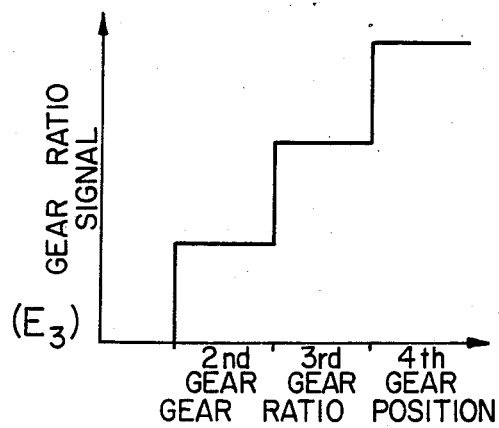
Figure 6:
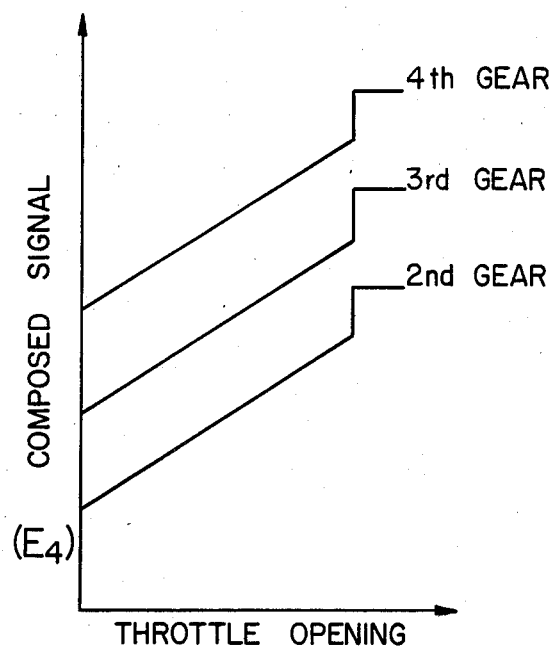
FIG. 6 is a graph showing the characteristics of the composed signal which is outputted from the arithmetic circuit of the control circuit.
Figure 7:
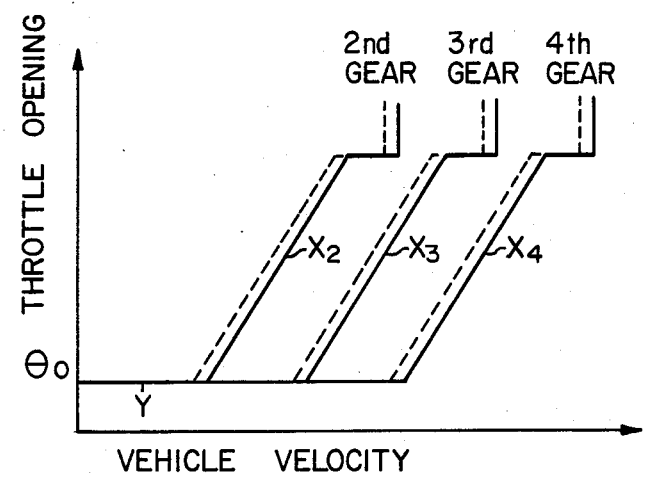
FIG. 7 is a graph showing the operating characteristics of the hydraulic clutch.

For accomplishing this controlled operation of valve 18, there are provided (1) a throttle opening detector 19 for generating a throttle opening signal $E_1$ having a voltage change, as shown in FIG. 3, in accordance with the throttle opening of the engine 1, (2) a vehicle velocity detector 20 for generating a vehicle velocity signal $E_2$ having a voltage change, as shown in FIG. 4, in accordance with the vehicle velocity, and (3) a gear ratio detector 21 for generating a gear ratio signal $E_3$, having a stepwise voltage change, as shown in FIG. 5, in accordance with the individual gear ratios of the 1st to 4th speeds. The gear ratio detector 21 is connected to the change lever 7 of the main transmission 3. The throttle opening signal $E_1$ and the gear ratio signal $E_3$ are summed up by an arithmetic circuit 22 to generate a composed signal $E_4$ as shown in FIG. 6. This composed signal $E_4$ is compared with the vehicle velocity signal $E_2$ by a comparator 23 to discriminate whether the voltage of the vehicle velocity signal $E_2$ is higher than the composed signal $E_4$ or not thereby to generate a logic signal "1" or "0". When the vehicle velocity signal $E_2$ becomes higher to generate the logic signal "1" from the comparator 23 so that the logic signal "1" is inputted to an electromagnetic circuit 18a of the change-over valve 18, the valve 18 is switched to the oil feed position to apply the hydraulic clutch 12 so that the high-speed transmission line GH is established in the regions higher than predetermined characteristic curves $X_2$, $X_3$, $X_4$ for each gear ratio, as shown in FIG. 7.

The comparator 23 is constructed to have hysterisis characteristics so that the shiftdown from the high-speed transmission line GH to the low-speed transmission line GL is effected at slightly lower sides of the individual characteristic curves $X_2$, $X_3$, $X_4$.

Here, according to the present invention, there is provided a high-speed transmission holder for holding the hydraulic clutch in its applied state when the throttle opening of the engine is below a predetermined level $\theta_o$. In the shown construction, the holder 24 is composed of a discriminator 25 which receives the throttle opening signal $E_1$ for discriminating whether the throttle opening is below the predetermined level or not and a NAND gate 26 disposed in the signal line between the comparator 23 and the electromagnetic circuit 18a. The discriminator 25 operates to generate the logic signal "0" when the throttle opening is below the predetermined level $\theta_o$ and the logic signal "1" when the throttle opening is above the predetermined level $\theta_o$. The logic signal from the discriminator 25 is inputted to the NAND gate 26, and the logic signal from the comparator 23 is inputted through an inverter 27 to the NAND gate 26.

According to the above construction, when the throttle opening of the engine 1 is larger than the predetermined level $\theta_0$, the logic signal "1" is inputted from the discriminator 25 to the NAND gate 26. In this case, the logic signal generated by the comparator 23 and the logic signal inputted to the electromagnetic circuit 18a at the output side of the gate 26 become coincident to control the application and release of the hydraulic clutch 12 in accordance with the aforementioned characteristics. When the throttle opening of the engine 1 becomes smaller than the predetermined level $\theta_0$, the logic signal "0" is inputted from the discriminator 25 to the gate 26. In such case, the logic signal "1" is always inputted to the electromagnetic circuit 18a, no matter how high the logic signal generated from the comparator 23 might be, to hold the hydraulic clutch 12 in the applied state so that the high-speed transmission line GH is established in the region below the line Y of FIG. 7.

The overall operations of the transmission of the present invention will be explained in the following. When the vehicle is running in the 2nd-speed gear ratio, for example, where the 2nd-speed gear train G2 of the main transmission 3 is established, the low-speed transmission line GL of the auxiliary transmission 4 is established at the lower speed side of the characteristic curve indicated at $X_2$ in FIG. 7. Normally, without the controls of this invention, if the accelerator pedal is released so as to brake the vehicle with the engine, the output side is allowed to overrun to make the braking on the engine ineffective by the action of the one-way clutch 13 incorporated into the low-speed transmission line GL. According to the present invention, however, the high-speed transmission holder 24 is operated, when the throttle opening of the engine 1 is made smaller than the predetermined level $\theta_o$, by releasing or letting up on the accelerator pedal, to apply the hydraulic clutch 12 and hold it in the applied state so that the high-speed transmission line GH is established to prohibit the overrun of the output side thereby to effect the braking of the vehicle by the engine. The holder 24 functions similarly for applying clutch 12 during the 3rd and 4th-speed gear operation of the vehicle.

The present invention may be applied to an arrangement in which the change-over valve 18 is switched by the change lever for the auxiliary transmission. For example, the high-speed transmission holder may be constructed such that the change-over valve 18 is electrically coactive with the change lever and such that, when the throttle opening of the engine 1 is below the predetermined level, the signal from the change lever is cut so that the change-over valve 18 may be preferentially fed with the signal for switching the valve 18 to the oil feed position.

Thus, according to the present invention, when the throttle opening of the engine is below the predetermined level, the hydraulic clutch disposed in the high-speed transmission line of the auxiliary transmission is always applied by the high-speed transmission holder so that the auxiliary transmission is switched from the low-speed transmission line having the one-way clutch to the high-speed transmission line thereby to effect the braking of the vehicle by the engine.

The invention claimed:

1. In a vehicular transmission having an auxiliary transmission with high-speed and low-speed transmission connected in series to a main transmission and an engine, wherein the auxiliary transmission has a hydraulic clutch disposed in the high-speed transmission line and a one-way clutch disposed in the low-speed transmission line, the low-speed transmission line being engaged through said one-way clutch when the hydraulic clutch is released, and the high-speed transmission line being engaged when said hydraulic clutch is applied and wherein said one-way clutch is overrunning, a controller improvement comprising, a high-speed transmission control means for applying and maintaining said hydraulic clutch in its applied state when the throttle opening of said engine is below a predetermined level.

2. The vehicular transmission controller improvement of claim 1 wherein said control means includes means for sensing the throttle opening, the vehicle velocity and the transmission gear ratio for applying said hydraulic clutch only under predetermined relationships among those sensed values.

3. The vehicular transmission controlled improvement of claim 1 wherein a change-over valve is selectively operated to apply or release said hydraulic clutch, and said control means includes means for automatically operating said change-over valve to apply said hydraulic clutch in response to said engine throttle opening being below said predetermined amount.

4. The vehicular transmission controller improvement of claim 3 wherein electromagnetic means are provided for operating said change-over valve, and said control means includes throttle opening sensing means for producing an electrical signal related to the position of the engine throttle and means for generating a signal to said electromagnetic means responsive to said the sensed throttle position.

5. A controller for controlling the operation of a two speed auxiliary transmission having a hydraulic clutch which is applied for a higher speed drive and released for the lower speed drive and having a one-way clutch in a lower speed drive which overruns during any reverse drive therethrough, which auxiliary transmission is connected in series with a main transmission and engine for powering a vehicle, comprising, means for sensing the throttle opening of the engine, and control means responsive to said sensing means for causing said hydraulic clutch to be applied and maintained for throttle openings below a predetermined amount for braking the vehicle with the engine through the higher speed drive.

6. The controller of claim 5 wherein means are provided for sensing the vehicle velocity, and said control means for causing said clutch to be applied is also responsive to said vehicle velocity sensing means.

7. The controller of claim 5 wherein means are provided for sensing the gear ratio of the main transmission, and said control means for causing said clutch to be applied is also responsive to said gear ratio sensing means.

* * * * *